(12) United States Patent
Kato (10) Patent No.: US 8,077,010 B2
(45) Date of Patent: Dec. 13, 2011

(54) RFID INTERROGATOR DEVICE

(75) Inventor: Masakazu Kato, Shizuoka (JP)

(73) Assignee: Toshiba TEC Kabushiki Kaisha, Tokyo (JP)

( * ) Notice: Subject to any disclaimer, the term of this patent is extended or adjusted under 35 U.S.C. 154(b) by 918 days.

(21) Appl. No.: 11/782,228

(22) Filed: Jul. 24, 2007

(65) Prior Publication Data

US 2008/0024280 A1 Jan. 31, 2008

(30) Foreign Application Priority Data

Jul. 28, 2006 (JP) ................................. 2006-206636

(51) Int. Cl.
*G05B 19/00* (2006.01)
*G05B 23/00* (2006.01)
*G06F 7/04* (2006.01)
*G08C 19/00* (2006.01)
*H04Q 5/22* (2006.01)
*H04L 27/08* (2006.01)
*H04B 1/06* (2006.01)
*H04B 7/00* (2006.01)

(52) U.S. Cl. ... 340/5.61; 340/10.1; 375/345; 455/232.1; 455/234.1

(58) Field of Classification Search .................. 340/5.61, 340/10.1; 375/345; 455/232.1, 234.1
See application file for complete search history.

(56) References Cited

U.S. PATENT DOCUMENTS

| 4,972,430 | A | * | 11/1990 | Cantwell ........................ 375/130 |
| 5,495,229 | A | * | 2/1996 | Balch et al. ................. 340/572.4 |
| 5,896,060 | A | * | 4/1999 | Ovard et al. ................... 329/304 |
| 6,658,069 | B1 | * | 12/2003 | Imura ............................ 375/345 |
| 7,386,074 | B1 | * | 6/2008 | Venkatesh et al. ............ 375/345 |
| 2001/0048727 | A1 | * | 12/2001 | Schmutz et al. ............... 375/345 |
| 2005/0058292 | A1 | * | 3/2005 | Diorio et al. .................. 380/270 |
| 2005/0084003 | A1 | | 4/2005 | Duron et al. |
| 2005/0088286 | A1 | * | 4/2005 | Heinrich et al. ........... 340/10.51 |
| 2005/0141656 | A1 | * | 6/2005 | Choi .............................. 375/345 |
| 2005/0163081 | A1 | * | 7/2005 | Aoki et al. ..................... 370/334 |
| 2005/0190098 | A1 | * | 9/2005 | Bridgelall et al. ............ 342/118 |
| 2006/0061453 | A1 | * | 3/2006 | Tuttle ........................... 340/10.6 |
| 2006/0084402 | A1 | * | 4/2006 | Oshima et al. ............. 455/232.1 |
| 2006/0121867 | A1 | * | 6/2006 | Yu et al. ..................... 455/234.1 |
| 2006/0293009 | A1 | * | 12/2006 | Kobayashi ................. 455/232.1 |

FOREIGN PATENT DOCUMENTS

| EP | 0583084 | 9/1999 |
| EP | 1 146 475 | 10/2001 |
| JP | 06-36087 | 2/1994 |

(Continued)

OTHER PUBLICATIONS

European Search Report issued in EP Application 07013971.2 on Jun. 10, 2009.

(Continued)

*Primary Examiner* — Jennifer Mehmood
*Assistant Examiner* — Andrew Bee
(74) *Attorney, Agent, or Firm* — DLA Piper LLP US (57) ABSTRACT

RFID interrogator device carries out an automatic gain control when an RF signal from RFID tag with a backscatter radio-communication is received. To carry out the automatic gain control, amplitude of the reception signal is measured within a prescribed time corresponding to a length of preamble added to the head of data of the RF signal. An AGC value is determined based on the measured amplitude value.

5 Claims, 8 Drawing Sheets

FOREIGN PATENT DOCUMENTS

| JP | 10-271079 | 10/1998 |
|----|-----------|---------|
| JP | 2003-92561 | 3/2003 |
| WO | WO 2004/059564 | 7/2004 |

OTHER PUBLICATIONS

English Abstract of JP 2003-92561 published Mar. 28, 2003.
English Language Machine Translation of JP 2003-92561 published Mar. 28, 2003.
English Language Abstract for JP 06-036087 published Feb. 10, 1994.
English Language Machine Translation for JP 06-036087 published Feb. 10, 1994.
English Language Abstract for JP 10-271079 published Oct. 9, 1998.
English Language Machine Translation for JP 10-271079 published Oct. 9, 1998.
Office Action issued in Chinese Appl 200710136780.2 on Jul. 2, 2010.
English Translation of Office Action issued in Chinese Appl 200710136780.2 on Jul. 2, 2010.
English Abstract of JP 10-271079 published Sep. 10, 1998.
English Translation of JP 10-271079 published Sep. 10, 1998.
Notice of Reasons for Refusal in Application No. 2006-206636, mailed Jul. 1, 2008.
English Machine Translation of JP2006512812 published Apr. 13, 2006.

* cited by examiner

RFID INTERROGATOR DEVICE

BACKGROUND OF THE INVENTION

1. Field of the Invention

The present invention relates in general to an RFID interrogator device which performs radio-communications with RFID tags by a backscatter system utilizing absorption and reflection of radio wave and, particularly to an RFID reader/writer or an RFID reader which controls an amplitude level of a reception signal from the RFID tag by a variable gain amplifier.

2. Description of the Related Art

Radio Frequency Identification (RFID) Systems typically include data carriers, such as, e.g. RFID tags, and RFID interrogators, such as, e.g., RFID reader/writer and the radio-communications between the RFID tags and the RFID reader/writers utilize the backscatter system.

RFID tags used in the RFID system may be a passive type or an active type. Passive type RFID tags have no power source whereas active type RFID tags have a power source or battery. Therefore, the passive type RFID tags have a small and portable external size. In the backscatter system, a passive type RFID tag may be used and thus, a RFID reader/writer transmits a continuous wave (CW) that encodes no information to the RFID tag and the RFID tag converts the received continuous wave to DC power as its power source. In addition, the continuous wave can also be used as a carrier signal. When the RFID tag intends to transmit a response to the RFID reader/writer, the RFID tag alternately carries out reflection and absorption of the received continuous wave by varying the impedance of its antenna in response to information to be transmitted. The RFID reader/writer receives this reflected wave from the RFID tag and decodes the reflected wave to obtain information from the RFID tag.

When the RFID reader/writer executes radio-communications with the RFID tag, the RFID reader/writer transmits the continuous wave to the RFID tag and simultaneously receives a reflected wave from the RFID tag because of the above-described backscatter system. Such a simultaneous operation is a typical manner of radio-communications with RFID tags. A linear modulation or keying including an Amplitude-Shift Keying (ASK) and a Phase-Shift Keying (PSK) is commonly used as a modulation system to carry out communications between RFID reader/writers and RFID tags.

On the other hand, a wireless LAN (Local Area Network) system performs linear modulation. With linear modulation, Automatic Gain Control (AGC) is used because, to maintain the linearity, it is required to amplify signals received without any distortion. AGC is a circuit provided in a reception section to maintain a received power constant such that the gain of an amplifier of the reception section is decreased when the RSSI (Received Signal Strength Indicator) is strong and the gain of the amplifier is increased when the RSSI is weak.

Japanese laid-open (kokai) patent application P2003-92561 discloses a radio-communications terminal apparatus that is provided with a reception device performing AGC and is used in a wireless LAN system. Transmission of a radio wave and reception of a radio wave are selectively switched and the RSSI is measured when reception is selected. When the received radio wave goes above a prescribed threshold value of the RSSI, AGC is initiated.

In a digital radio-communications system, such as, e.g., wireless LAN, a radio-communications terminal apparatus transmits radio wave when transmitting and receives radio wave when receiving. Transmission and reception is selectively performed in this system. However, when the RFID reader/writer executes radio-communications with the RFID tag, a backscatter system may be adopted. When the RFID reader/writer receives a response from the RFID tag, the RFID reader/writer transmits radio wave (CW) to the RFID tag and simultaneously receives reflected radio wave (response) from the RFID tag, as described above. In this simultaneous operation by the RFID reader/writer, a short cut of radio wave from the transmission subsystem to the reception subsystem may occur during the reception of the reflected radio wave having a weak power from the RFID tag.

An amount of radio wave short-cutting from the transmission subsystem to the reception subsystem is quite large compared with that of the reflected radio wave from the RFID tag. Thus, it may be difficult to precisely determine a timing at which the reflected radio wave from the RFID tag is firstly received by the RFID reader/writer based on the RSSI. Accordingly, it is not appropriate to adopt a system, utilized in a wireless LAN system that a reception timing of the reflected radio wave is detected based on the RSSI and then AGC is started, to the RFID reader/writer that performs radio-communications with RFID tags.

SUMMARY OF THE INVENTION

Accordingly, an object of the present invention is to perform a suitable automatic gain control to radio-communications with RFID tags in an RFID interrogator device.

To accomplish the above-described object, an RFID interrogator device of the present invention, having a reader function, which conducts a backscatter radio-communications with an RFID tag, utilizing absorption and reflection of radio wave, comprising:

a transmission section configured to transmit a command to the RFID tag, the transmission section also transmitting a continuous radio wave with no modulation to the RFID tag to enable the RFID tag to carry out the backscatter radio-communications;

a reception section configured to receive an RF signal from the RFID tag with the backscatter radio-communications to obtain a reception signal, the reception section having a variable gain amplifying function;

an automatic gain control section configured to measure an amplitude of the reception signal within a prescribed time after a predetermined time Ta has passed from the completion of the transmission of the command to the RFID tag; and a control section configured to make the reception section execute the variable gain amplitude function based on the measured amplitude value to modify the amplitude of the received RF signal to a desired level.

BRIEF DESCRIPTION OF THE DRAWINGS

These and other objects and advantages of this invention will become apparent and more readily appreciated from the following detailed description of the presently preferred exemplary embodiments of the invention taken in conjunction with the accompanying drawings wherein.

DETAILED DESCRIPTION OF THE INVENTION

Preferred embodiments of the present invention will now be described in more detail with reference to the accompanying drawings. However, the same numerals are applied to the similar elements in the drawings, and therefore, the detailed descriptions thereof are not repeated.

First Embodiment

Figure 1:
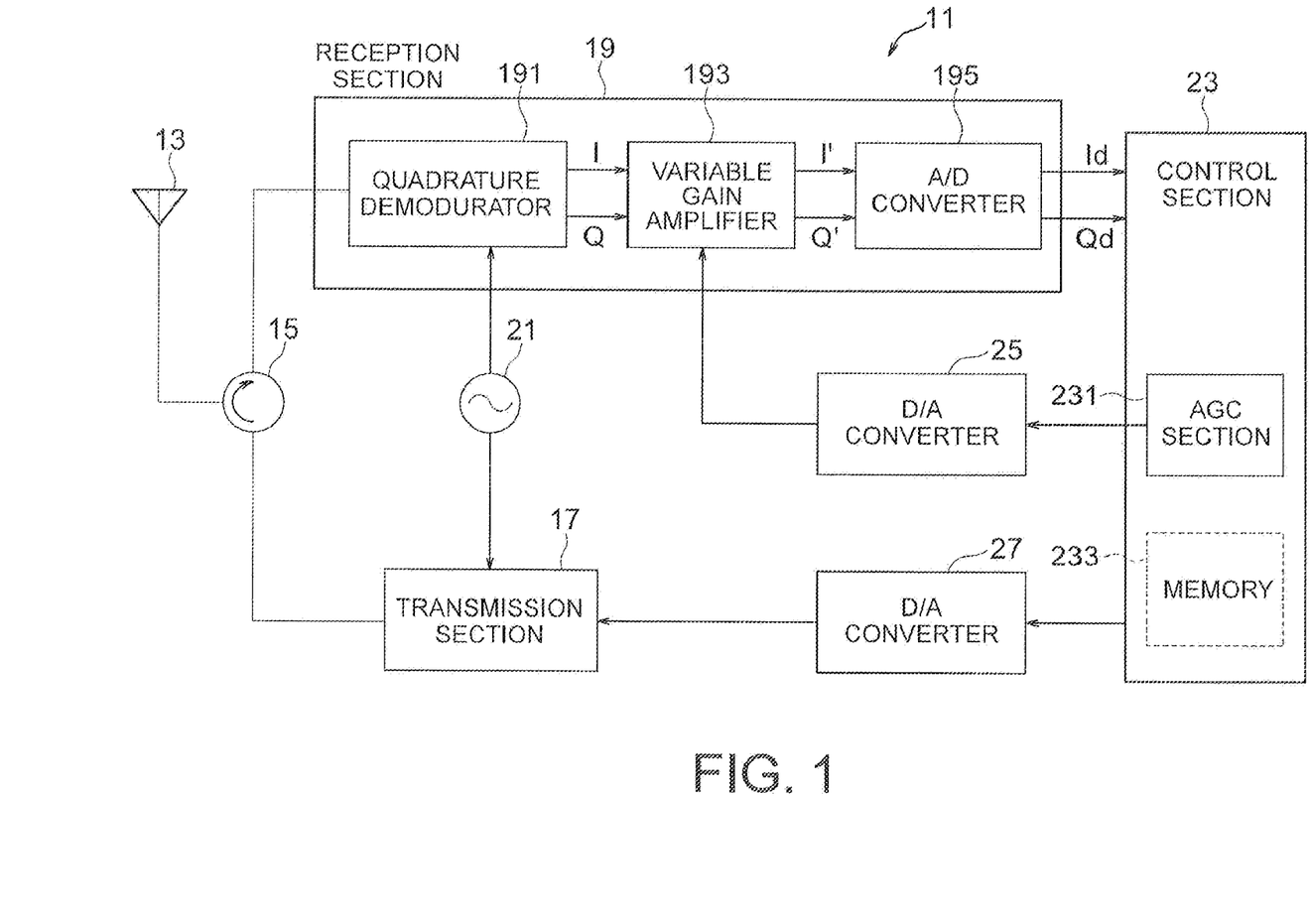
FIG. 1 is a block diagram illustrating construction of an RFID tag reader/writer according to one embodiment of the present invention.

FIG. 1 is a block diagram illustrating a structure of an RFID reader/writer acting as an RFID interrogator device. The RFID reader/writer 11 includes an antenna 13, a circulator 15 connected to the antenna 13 which separates a transmission wave and a reception wave, and a transmission section 17 and reception section 19, respectively connected to the circulator 15. The reception section 19 is composed of a quadrature demodulator 191, a variable gain amplifier 193 and an A/D (Analog to Digital) converter 195.

The RFID reader/writer 11 further includes a local oscillator 21 and a control section 23 having an automatic gain control (AGC) section 231. This AGC section 231 can be realized by a hardware structure or a software structure. The local oscillator 21 provides a frequency signal for modulation/demodulation to both the quadrature demodulator 191 of the reception section 19, and the transmission section 17. The AGC section 231 is configured to carry out an automatic gain control of the variable gain amplifier 193.

The RFID reader/writer 11 also includes a first D/A converter 25 that converts a digital output of the AGC section 231 to an analog thereof and outputs it to the variable gain amplifier 193, and a second D/A converter 27 that converts a transmission data output from the control section 23 (D/A Conversion) and outputs to the transmission section 17.

In the above-described RFID reader/writer 11, when receiving a backscattered signal (RF signal) from an RFID-tag (not shown) by the antenna 13, the backscattered signal is fed to the reception section 19 through the circulator 15. in the reception section 19, the backscattered signal is input to the quadrature demodulator 191, where a signal having a frequency the same as that of the transmission is input from the local oscillator 21. Thus, the quadrature demodulator 191 demodulates (downconvert), as being well known in the art, the backscattered signal to respective base band signals (reception signal), i.e., I (in-phase) signal and Q (quadrature) signal to supply them to the following variable gain amplifier 193.

The variable gain amplifier 193 respectively amplifies I and Q signals to a prescribed level and then outputs I' and Q' signals (amplified signals) to provide them to the A/D converter 195. The A/D converter 195 converts I' and Q' signals to Id and Qd signals (digital signals) to output them to the control section 23, as shown in FIG. 1.

The control section 23 carries out a base-band processing to generate a reception data from the Id and Qd signals output from the A/D converter 195 (demodulation). At this time, the AGC section 231 of the control section 23 outputs a signal for controlling gain of the variable gain amplifier 193 so that received Id and Qd signals respectively has an optimum gain for reception. The base-band processing is also called as a digital processing. In detail, digital signals (Id and Qd signals) from the A/D converter 195 are filtered and are signal-processed to generate the reception data.

An AGC control operation by the AGC section 231 of the control section 23 will be described with reference to FIG. 2.

Figure 2:
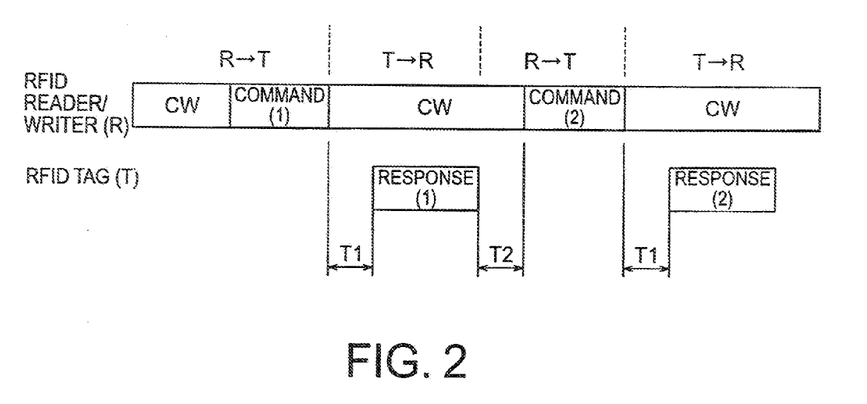
FIG. 2 is a timing chart illustrating communication between the RFID tag reader/writer and an RFID tag.

FIG. 2 is a timing chart illustrating communication between an RFID reader/writer and an RFID tag. In the figure, (R) denotes an RFID reader/writer and (T) denotes an RFID tag. Also, when the RFID reader/writer (R) talks to the RFID tag (T), the session is indicated as "R→T", and when the RFID tag (T) responds to the RFID reader/writer (R), the session is indicated as "T→R".

In a first R→T session, the RFID reader/writer 11 transmits a continuous wave (CW) with no modulation to the RFID tag (T) before sending a command (interrogation command). After that, a command (1) is transmitted. The session is changed to a first T→R session and the REID reader/writer 11 changes its state from a transmission to a reception. In the first T→R session, the RFID reader/writer 11 transmits the continuous wave with no modulation to the RFID tag (T) even if the session is changed from R→T to T→R to enable the RFID tag (T) to generate its power from the continuous wave, as described above.

When the RFID tag (T) receives the command from the RFID reader/writer 11, the tag (T) sends a response (1) after a time period (T1) has passed. The time period (T1) is specified by the EPC global Class-1 Generation-2 (hereinafter referred to as GEN2), which is now in the process of being admitted as an International standard.

When the RFID reader/writer 11 further transmits a command (2), the reader/writer 11 sends a further command (2) to the RFID tag (T) after a time period (T2) has passed in a second R→T session. The time period (T2) is also specified by the GEN2. When the RFID tag (T) receives the command (2) from the RFID reader/writer (R), as similar to the command (1), the RFID tag (T) sends back a response (2) responding to the command (2) after the time period (T1) has passed while the RFID reader/writer 11 sends the continuous wave (CW) to the RFID tag (T) in a second T→R session.

According to the GEN2, the time periods (T1) and (T2) are specified as follows:

$T1$=238 μsec (minimum), 250 μsec (standard) and 262 μsec (maximum), and $T2$=75 μsec (minimum) and 500 μsec (maximum)

when the communication speed is 40 k bps.

As described above, since the time period (T1) from the transmission of the command by the RFID reader/writer 11 to the sending back of the response by the RFID tag (T) is specified, an AGC process which is peculiar to the RFID reader/writer 11 is performed, utilizing such specifications.

Figure 3:
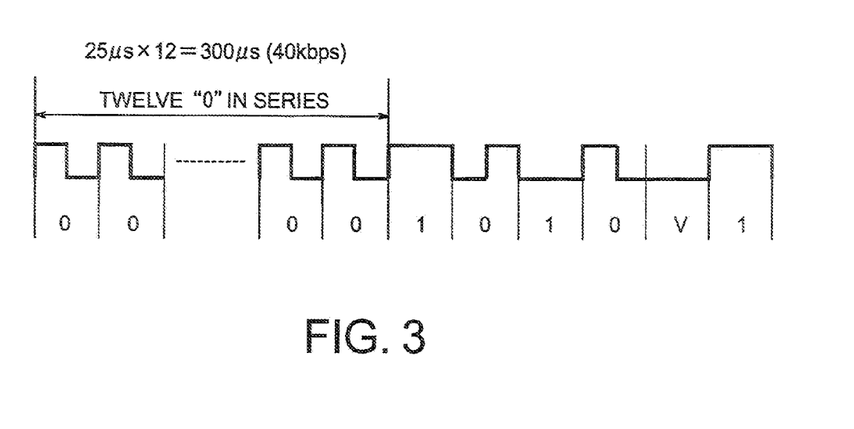
FIG. 3 is a view illustrating a preamble pattern attached to the head of data when the RFID tag sends a response.

FIG. 3 indicates a preamble added to the head of data when the RFID tag (T) sends back a response. According to the GEN2, it provides that a twelve "0" in series is added to the head of a pattern "1010V1". It should be noted that an FM0 coding is adopted in this embodiment and, in FM0 coding, "0" is represented by "10" or "01" and "1" is represented by "00" or "11".

According to the GEN2, it is allowable that a preamble composed of only a pattern "1010V1" without adding a twelve "0" in series. In the present embodiment, however, a preamble in which a twelve "0" in series is added is used and an AGC process is executed at a portion of the series of the twelve "0" in a preamble.

Figure 4:
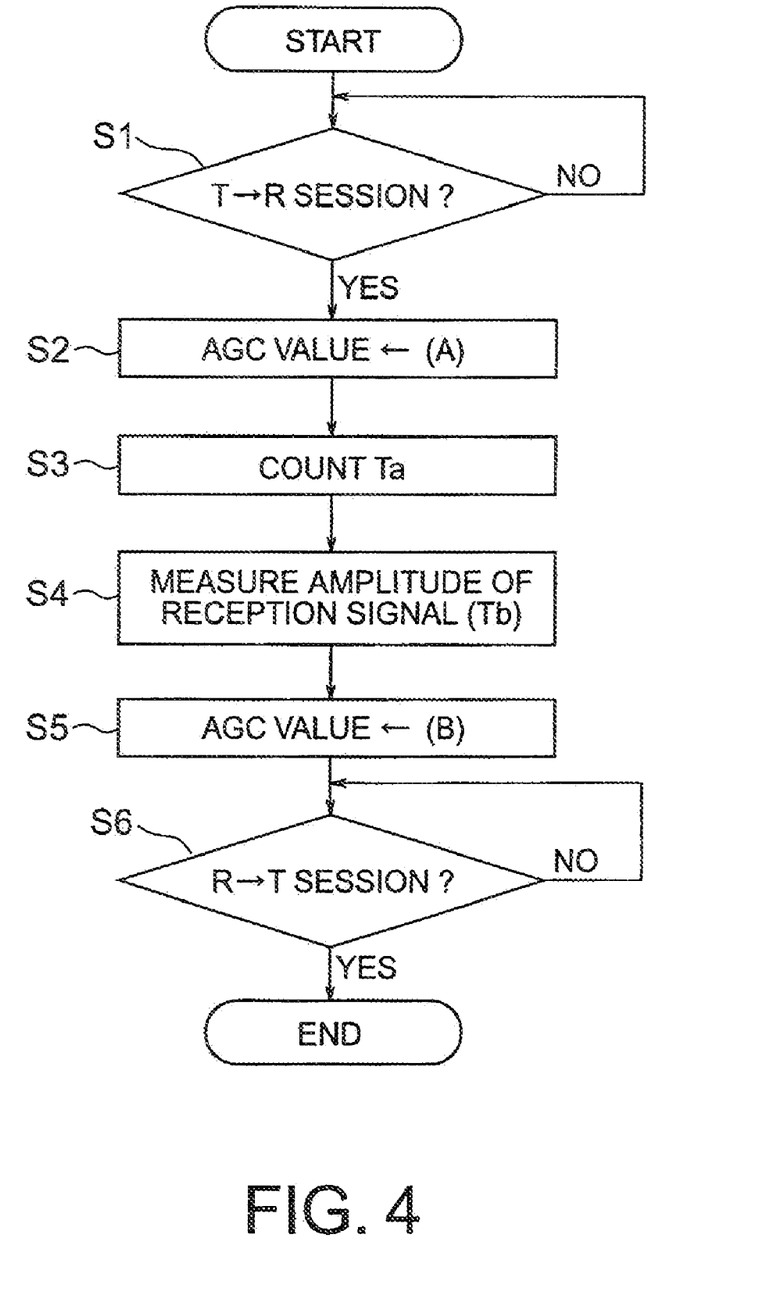
FIG. 4 is a flow chart illustrating an AGC process executed by an AGC section of a control section of the RFID tag reader/writer.

FIG. 4 illustrates an AGC process performed by the AGC section 231 of the control section 23.

In step S1, it is judged whether the RFID reader/writer 11 is in the reception state (T→R session). If the judgment is affirmative, YES pass is taken and step S2 is executed. Otherwise, NO pass is taken and step S1 is repeated. In step S2, an AGC value of the variable gain amplifier 193 is set to a predetermined value (A). And then step S3 is executed and the AGC process maintains its state until a fixed time period Ta is counted. The fixed time period Ta is set to, for example, 220 μsec less than the minimum value (238 μsec) of the time period T1 specified by the GEN2 as described above.

When the fixed time period Ta has been counted, step S4 is executed and amplitude of a reception signal is measured for a prescribed time Tb. For example, in case that the communication speed is 40 k bps, a time period corresponding to a twelve "0" in series is 300 μsec ((1/40 k)×12=25 μsec× 12=300 μsec) and thus the prescribed time Tb is 300 μsec. However, it is not essentially required that the prescribed time Tb is set to 300 μsec. It may be larger or less than 300 μsec. In short, it is sufficient to achieve that the measurement of amplitude of the reception signal is completed within the prescribed time Tb.

Based on the result (measurement value) of step S4, a reception AGC value (B) is determined and then the AGC value of the variable gain amplifier 193 is changed from the value (A) to the value (B) in step S5. Naturally, if the measured amplitude is large, the AGC value (B) is small and the AGC value (B) is large otherwise.

Regarding the determination of the AGC value (B), for example, it may prepare a table beforehand that indicates a plurality of AGC values (B) respectively corresponding to a plurality of amplitude values and an AGC value (B) may be determined based on the maximum value of amplitude measured for a prescribed time Tb, referring to the table. The table may be provided either in the memory 233 or in the AGC section 231.

The process of the determination of the AGC value is described in more detail. The AGC value is firstly set to a default value (A) and the measurement of amplitude of the reception signal is executed. An amplitude value obtained here is within a range of 0~255 when a bit-width used in the process by the control section is an 8 bit, for example. Next, based on the amplitude value obtained by the measurement, the AGC value (A) is changed to a value (B) so that the amplitude value of the reception signal becomes a target value, i.e., 128. That is, the AGC value (B) is determined such that it is set to a value less than the value (A) if the amplitude of the reception signal is greater than the target value (128) and to a value greater than the value (A), otherwise.

In step S6, it is judged whether the state of the RFID tag reader/writer 11 is changed to the transmission state (R→T session). When the state of the RFID reader/writer 11 is not changed, NO pass is taken and step S6 is repeated. This means that the determined AGC value (B) is maintained during the reception state (T→R session) of the RFID reader/writer 11. When the judgment in step 6 is affirmative, YES pass is taken and the AGC process is terminated.

It may maintain the determined AGC value (B) after the completion of the response by the RFID tag (T) also. However, for example, since the AGC control is not required if the state of the RFID reader/writer 11 is changed to the transmission state (R→T session), the determined AGC value may be reduced to a minimum or zero (0). In addition, if the RFID reader/writer 11 is in a carrier-sense state, the AGC value of the RFID reader/writer 11 may be set to a maximum to be able to easily communicate with a target RFID tag (T) in a communication area.

Figure 5:
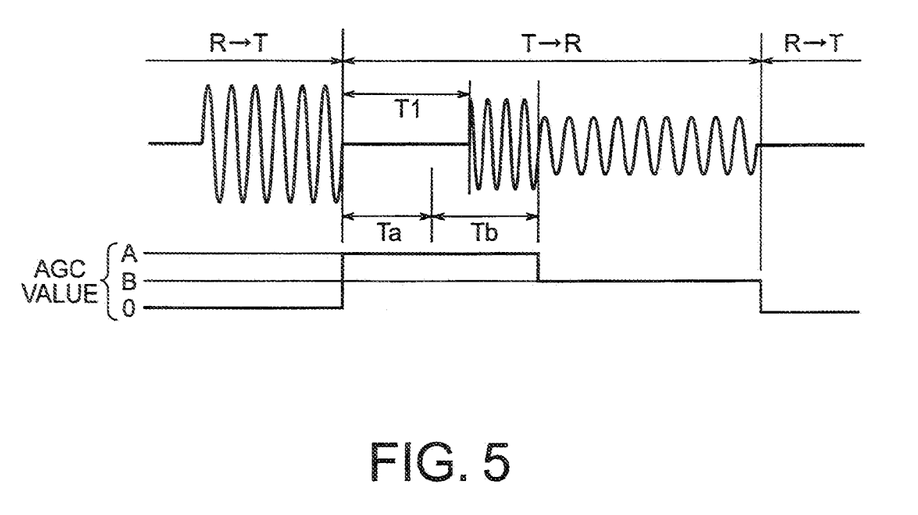
FIG. 5 is a waveform diagram illustrating relationship between variations of amplitude of a received signal and variations of AGC value.

FIG. 5 illustrates an example of changes in amplitude of I' or Q' signal (reception signal) according to the AGC control. I' and Q' signals are base band signals output from the variable gain amplifier 193. The AGC section 231 sets a predetermined AGC value (A) to the variable gain amplifier 193, as shown in FIG. 5, when the session is changed to the session "T→R" in which the RFID tag (T) transmits a response. When the fixed time period Ta has passed, amplitude of a reception signal is measured during the prescribed time period Tb and the AGC value is changed from (A) to (B) based on the measured value when the prescribed time period Tb has passed.

As described above, in the reception state (T→R session) of the RFID reader/writer 11 in which a response from the RFID tag (T) can be received, the RFID reader/writer 11 measures amplitude of a reception signal from the RFID tag (T) for a time period that a twelve "0" in series within the preamble added to the head of the response from the RFID tag (T) is continued such that amplitude of the reception signal is measured for the prescribed time Tb after the fixed time period Ta has passed. And thus, an AGC value (B) based on the measured value is set. When the pattern "1010V1" following the twelve "0" is received, since the AGC value has already been set to a correct one, i.e., B, reception of the pattern "1010V1" can be performed appropriately. Therefore, the RFID reader/writer 11 can perform an appropriate AGC control while the reader/writer 11 simultaneously carries out transmission/reception with the RFID tag (T).

Second Embodiment

A second embodiment of the present invention will be described. In the second embodiment also, structure thereof is the same as that in FIG. 1 and therefore a detail explanation thereof is not repeated. A difference between the first embodiment and the second embodiment is an AGC process executed by the AGC section 231 of the control section 23. The AGC process executed by the AGC section 231 will be described with reference to FIG. 6.

Figure 6:
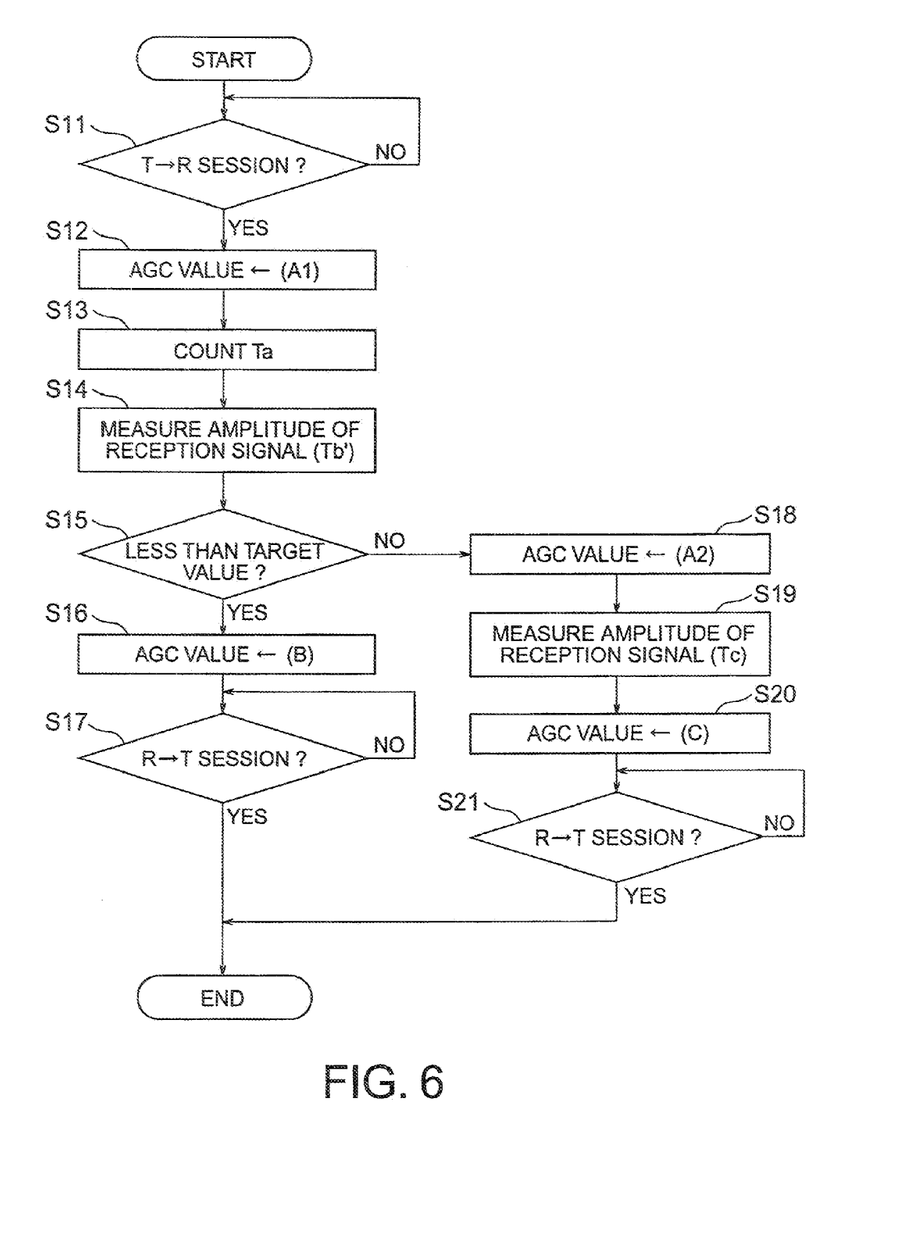
FIG. 6 is a flow chart illustrating an AGC process executed by an AGC section of control section of the RFID tag reader/writer according to a second embodiment.

In step S11, it is judged whether the RFID reader/writer 11 is in the reception state (T→R session) or not. If the judgment is affirmative, YES pass is taken and step S12 is executed. Otherwise, NO pass is taken and step S11 is repeated. In step S12, an AGC value of the variable gain amplifier 193 is set to a predetermined value (A1). And then step S13 is executed and the AGC process maintains its state until a fixed time period Ta is counted. The fixed time period Ta is set to, for example, 220 μsec less than the minimum value (238 μsec) of the time period T1 specified by the GEN2 as described above.

When the fixed time period Ta has been counted, step S14 is executed and amplitude of a reception signal is measured for a prescribed time Tb' (first measurement means). For example, in case that the communication speed is 40 k bps, a time period corresponding to a twelve "0" in series is 300 μsec ((1/40 k)×12=25 μsec×12=300 μsec) and thus the prescribed time Tb' is set to a half of 300 μsec, i.e., 150 μsec.

Based on the result (measurement value) of step S14, it is judged whether the measured amplitude value is less than the prescribed threshold value in step S15. If the judgment is affirmative, YES pass is taken and step S16 is executed. Otherwise, NO pass is taken and step S18 is executed. In step S16, as similar to the first embodiment described above, an AGC value (B) is determined based on the measured value and then the AGC value of the variable gain amplifier 193 is changed from the value (A1) to the value (B). Naturally, if the measured amplitude is large, the AGC value (B) is small and the AGC value (B) is large otherwise.

Regarding the determination of the AGC value (B), for example, it may prepare a table beforehand that indicates a plurality of AGC values (B) respectively corresponding to a plurality of amplitude values and an AGC value (B) may be determined based on the maximum value of amplitude measured for a prescribed time Tb', referring to the table. That is, the case that the measured amplitude value is not less than the prescribed threshold value in step S15 indicates that the measured amplitude value is 255 which indicates saturation or near 255 when a bit-width used in the process by the control section is an 8 bit, for example.

In step S17, it is judged whether the state of the RFID reader/writer 11 is changed to the transmission state (R→T session). When the state of the RFID reader/writer 11 is not changed, NO pass is taken and step S17 is repeated. This means that the determined AGC value (B) is maintained during the reception state (T→R session) of the RFID reader/writer 11. When the judgment in step S17 is affirmative, YES pass is taken and the AGC process is terminated.

As described above, If NO pass is taken in step S15, step S18 is executed and thus the AGC value is changed from the predetermined value (A1) to a second predetermined value (A2:A2<A1) to decrease the gain of the variable gain amplifier 193. In step S19, the amplitude of the reception signal is measured for a second prescribed time period Tc (second measurement means). The second prescribed time period Tc is obtained by subtracting the prescribed time period Tb' (e.g., 150 μsec) from the prescribed time Tb (e.g., 300 μsec), that is, 150 μsec. After that, step S20 is executed and an AGC value (C) is determined based on the result of the measurement in step S19 to change AGC value of the variable gain amplifier 193 from the value (A2) to the value (C). As described above, if the measured amplitude is large, the AGC value (C) is small and the AGC value (C) is large otherwise. A table indicating relationship between measured amplitudes and AGC values (C) may be prepared to determine AGC value (C) based on the measured amplitude.

The AGC value (C) is maintained until the state of the RFID reader/writer 11 is changed from the reception state (T→R session) to the transmission state (R→T session). In step S21, the state change is judged and if the judgment is affirmative, YES pass is taken. The AGC process is then terminated. Otherwise, NO pass is taken and step S21 is repeated until the state of the RFID reader/writer 11 is changed.

It may maintain the determined AGC value (C) after the completion of the response by the RFID tag (T) also. However, for example, since the AGC control is not required if the state of the RFID reader/writer 11 is changed to the transmission state (R→T session), the determined AGC value (C) may be reduced to a minimum or zero (0). In addition, if the RFID reader/writer 11 is in a carrier-sense state, the AGC value of the RFID reader/writer 11 may be set to a maximum to be able to easily communicate with a target RFID tag (T) in a communication area.

Figure 7:
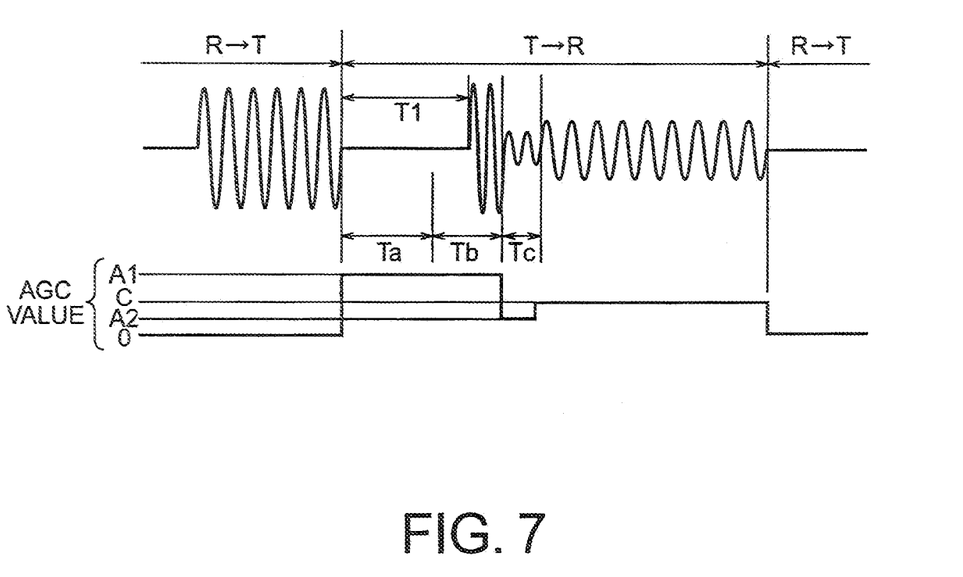
FIG. 7 is a waveform diagram illustrating a relationship between variations of amplitude of a received signal and variations of AGC value in the second embodiment.

FIG. 7 shows one example of changes in amplitude of one of the reception signals I' and Q' according to the AGC process. The reception signals I' and Q' are base band signals output from the variable gain amplifier 193. The AGC section 231 sets a predetermined AGC value (A1) to the variable gain amplifier 193 when the state of the RFID tag (T) changes to the transmission state (T→R session), as shown in FIG. 7, during which the RFID tag (T) transmits a response to the RFID reader/writer 11. After the fixed time period Ta has passed from the state change, the amplitude of the reception signal is measured for the prescribed time period Tb' and the AGC value (A1) set in the variable gain amplifier 193 is changed to the second predetermined value (A2) if the measured amplitude value exceeds the prescribed threshold value. And then, the amplitude of the reception signal is measured again for the second prescribed time period Tc and the AGC value (A2) of the variable gain amplitude 193 is further changed to the value (C) based on the measured amplitude value.

As described above, the RFID reader/writer 11 changes its state to the reception state (T→R session) during which it can receive the response signal from the RFID tag (T), the amplitude of the signal from the RFID tag (T) is measured after the fixed time period (Ta) has passed. If the measured amplitude value is large exceeding the prescribed threshold value, the AGC value of the variable gain amplifier 193 is reduced from value (A1) to value (A2). The amplitude of the reception signal from the RFID tag (T) is measured again in the state that the AGC value (A2) is maintained. Then the AGC value (C) is determined based on the measured amplitude value. These chain of measurements is carried out during the time period that twelve "0" in series in the preamble added to the head of the response from the RFID tag (T) presents and the AGC value (C) is set when the pattern "1010V1" subsequent to the twelve "0" begins.

According to the above-description, it can be understood that the RFID reader/writer 11 achieves an optimum automatic gain control to the radio-communication with the RFID tag (T) during simultaneous transmission/reception of signals to and from the RFID tag (T). In addition, a dynamic range of the RFID reader/writer 11 can be wide when the RFID reader/writer 11 receives a response from the RFID tag (T).

In the above-described first and second embodiments, explanations thereof are performed, as the RFID reader/writer 11 is an example of the RFID interrogator. However, an RFID reader which only has a reading function of signal from the RFID tag may be used as an RFID interrogator. Furthermore, an average value of the measured amplitude may be used when the AGC value is determined although a maximum value thereof is used in the first and second embodiments.

Third Embodiment

A third embodiment of the present invention will be described. In the third embodiment also, structure thereof is the same as that in FIG. 1 and therefore a detail explanation thereof is not repeated. It should be noted that a writing function transmitting a signal to write data in the RFID tag is essential in this embodiment, such function being well known in the art and thus detail explanation thereof being not repeated.

Description is given in such a case that a read sequence in which the RFID reader/writer reads data from the RFID tag and, a write sequence in which the RFID reader/writer writes data into the RFID tag both are executed.

Figure 8:
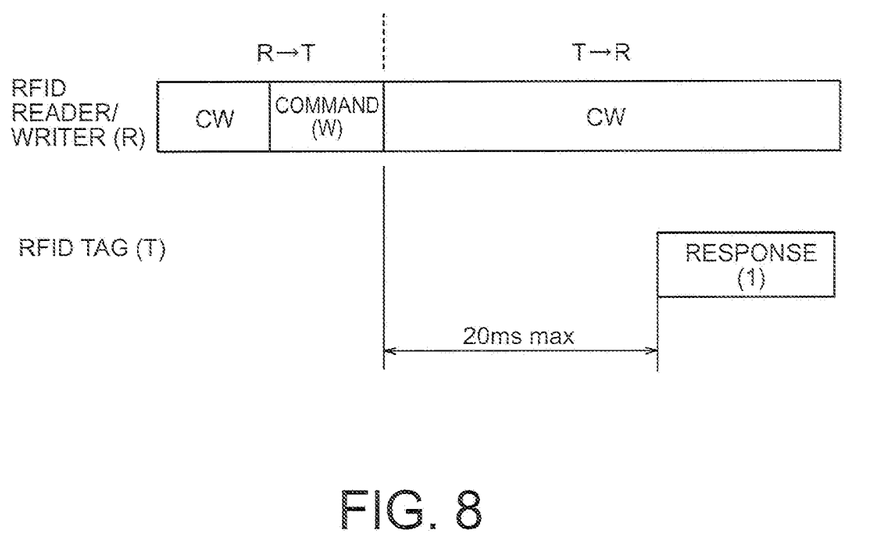
FIG. 8 is a timing chart illustrating an exchange of command relating to a write operation in the communication between the RFID tag reader/writer and the RFID tag according to a third embodiment.

According to the GEN2, a timing shown in FIG. 8 has been determined, as a write sequence, other than the timing shown in FIG. 2. FIG. 8 indicates that 20 msec in maximum is required as a response time of the RFID tag (T) to a command W transmitted from the RFID reader/writer 11. As can be seen in FIG. 8, 20 msec is extremely large compared with the time (T1) shown in FIG. 2. The command W in this embodiment is a write operation related command (WORC), such as, e.g., Write, Kill, Block Write, Block Erase.

The AGC section 231 of the control section 23 of the RFID reader/writer 11 that executes WORC includes a discriminating function well known in the art. The discriminating function may be realized by a hardware structure or a software structure and discriminates whether a command transmitted by the RFID reader/writer 11 to the RFID tag (T) is WORC or not (a read operation related command: RORC).

If the discriminating function discriminates a command as RORC, the AGC value set by the measurement when a response from the RFID tag (T) to the command (RORC) is received, is stored in the memory 233. On the other hand, if the discriminating function discriminates a command as WORC, the AGC operation is not performed on a response of the RFID tag (T) against this command (WORC) and the AGC value, stored in the memory 233, that is set when the RFID tag (T) responds to RORC just before this WORC is transmitted, is read out to use it when the RFID reader/writer 11 receives a response from the RFID tag (T).

Figure 9:
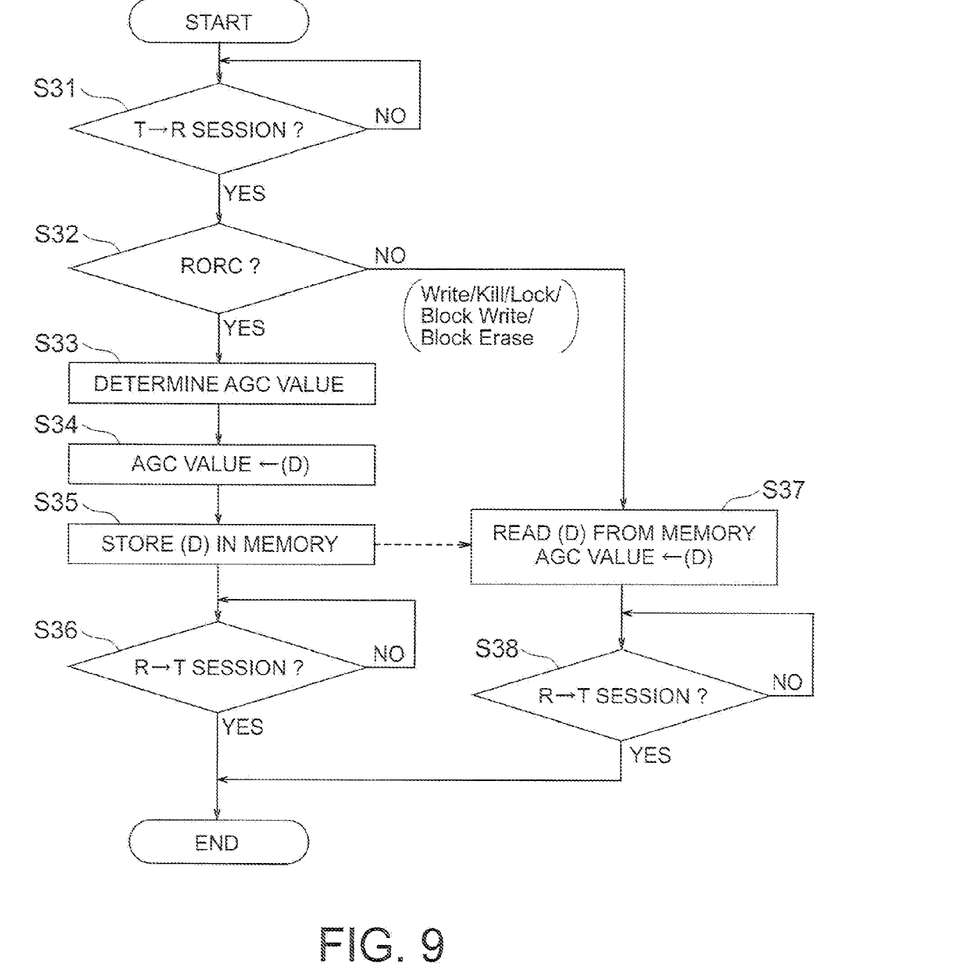
FIG. 9 is a flow chart illustrating an AGC process executed by an AGC section of control section of the RFID tag reader/writer of the third embodiment.

The AGC section 231 of the control section 23 which executes the RORC performs an AGC process shown in FIG. 9. In step S31, the state of the RFID reader/writer 11 is determined. When it is determined that the RFID reader/writer 11 is in T→R session, YES pass is taken and step S32 is executed. Otherwise, NO pass is taken and step S31 is repeated.

In step S32, it is discriminated whether a command transmitted by the RFID reader/writer 11 to the RFID tag (T) is the RORC or not. When the command transmitted to the RFID tag is the RORC in step S32, then YES pass is taken and step S33 is executed. In step S33, AGC value determination process is carried out when a response from the RFID tag (T) to the RORC is received. When this determination process is carried out, a process shown in steps S2~S4 of FIG. 4, or one of processes shown in steps S12~S15 and in steps S12~S15, S18 and S19 of FIG. 6 may be executed.

In step S34, based on the result of the determination process in step S33, AGC value (D) is determined and the AGC value of the variable gain amplifier 193 is changed to the value (D). The value (D) is also stored in the memory 233 in step S35. And then, in step S36, the state of the RFID reader/writer 11 is determined. When it is discriminated that the state of the RFID reader/writer 11 is changed to the R→T session, YES pass is taken and the AGC process is terminated. Otherwise, step S36 is repeated.

When it is determined in step S32 that the command is the WORC, NO pass is taken and step S37 is executed. In step S37, AGC value (D), stored in the memory 233, that is determined and stored when a response to the RORC (a command sent just before the WORC is transmitted) is received by the RFID reader/writer 11 is read out and the AGC value (D) is set to the variable gain amplifier 193. In step S38, it is discriminated whether the state of the RFID reader/writer 11 is in the R→T session or not to maintain the value (D) during the reception state (T→R session) of the RFID reader/writer 11. When the state change from the T→R session to the R→T session is discriminated in step S38, YES pass is taken and the AGC process is terminated. Otherwise, step S38 is repeated.

In the above-described embodiment, it may maintain the AGC value (D) in the variable gain amplifier 193 after a response from the RFID tag (T) is completed. However, it may be changed to zero or a minimum value because the AGC value (variable gain amplifying operation) is not required when the RFID reader/writer sends a command to the RFID tag (T). When the RFID reader/writer 11 is in a carrier-sense state, the AGC value may be changed to a maximum value.

According to the above construction and procedure, it can perform a suitable AGC process when the RFID reader/writer, that uses a write operation related command (WORC), receives a response from the RFID tag.

In the above-described embodiments, each embodiment is described when the communication speed is 40 k bps. However, the communication speed is not limited to 40 k bps and thus a predetermined time period T1, a fixed time period Ta, and a prescribed time period Tb, Tb' and Tc must be changed when the communication speed is changed, accordingly. In the embodiments also, a base band signal, which is generated directly from the RF signal transmitted from the RFID tag, is used to conduct the AGC process. However, the based band signal may be generated from an IF signal (Intermediate Frequency signal) which is firstly generated from the RF signal. Thus, the IF signal may be used when the AGC process is performed and therefore the reception signal in the embodiments includes not only the base band signal but also the IF signal.

The present invention has been described with respect to specific embodiments. However, other embodiments based on the principles of the present invention should be obvious to those of ordinary skill in the art. Such embodiments are intended to be covered by the claims.

What is claimed is:

1. An RFID interrogator device which conducts a backscatter radio-communication with an RFID tag, utilizing absorption and reflection of radio wave, comprising:
    a transmission section configured to transmit a write operation related command and a read operation related command to the RFID tag;
    a quadrature demodulator configured to demodulate an RF signal from the RFID tag to obtain a base band signal;
    a variable gain amplifier configured to amplify the base band signal from the demodulator to a desired level;
    a memory configured to store therein an automatic gain control (AGC) value; and
    a controller configured to:
        determine whether a command transmitted to the RFID tag is the write operation related command or the read operation related command;
        when the command transmitted to the RFID tag is the read operation related command, measure an amplitude of the base band signal within a prescribed time after a predetermined time Ta has passed from the completion of the transmission of the read operation related command to the RFID tag, determine the AGC value based on the measured amplitude value, store the AGC value in the memory, and read the AGC value out of the memory and set the read AGC value in the variable gain amplifier; and
        when the write operation related command is to be transmitted, cause the AGC value to be read out of the memory to set the gain of the variable gain amplifier for the entirety of the RF signal received by the demodulator from the RFID tag in response to the write operation related command without measuring the amplitude of the base band signal for the duration of the reception of the RF signal from the RFID tag by the demodulator.

2. The device according to claim 1, wherein the predetermined time Ta is less than a time period T1 from the completion of reception of the command by the RFID tag to the commencement of transmission of the RF signal by the RFID tag.

3. The device according to claim 1, wherein the controller changes the AGC value to execute further measurement of amplitude of the base band signal for the predetermined time when the measured amplitude value exceeds a target value and controls the operation of the variable gain amplifier based on the measured amplitude value of the further measurement.

4. The device according to claim 3, wherein the controller changes the AGC value to an AGC value less than the predetermined AGC value when the measured amplitude value exceeds the target value.

5. The device according to claim 3, wherein the RF signal from the RFID tag includes a preamble which is used when the controller measures amplitude of the base band signal demodulated from the RF signal.

* * * * *